June 7, 1938.  J. R. WYATT  2,120,223

INDUCTION ELECTRIC FURNACE AND METHOD

Filed Aug. 15, 1934  4 Sheets-Sheet 1

June 7, 1938. J. R. WYATT 2,120,223
INDUCTION ELECTRIC FURNACE AND METHOD
Filed Aug. 15, 1934 4 Sheets-Sheet 4

Patented June 7, 1938

2,120,223

UNITED STATES PATENT OFFICE 2,120,223

INDUCTION ELECTRIC FURNACE AND METHOD

James R. Wyatt, Camden, N. J., assignor to Ajax Electric Furnace Corporation, Philadelphia, Pa., a corporation of Pennsylvania Application August 15, 1934, Serial No. 739,967

8 Claims. (Cl. 13—29)

The invention relates to induction electric furnaces for melting metal if desired but ordinarily for holding molten metals or alloys in melted condition or/and superheating them at temperatures, however, well below the melting point of non-magnetic metal with which the metals or alloys come in contact.

The main purpose of the invention is to provide a non-magnetic metallic furnace casing within which the molten metal is retained.

A further purpose is to apply to the melting or holding of molten metals and alloys, with or without superheating, containers, preferably of alloy type, which are non-magnetic and which include so-called non-magnetic steels.

A further purpose is to provide an electric induction furnace of submerged channel resistor type having non-magnetic alloy walls.

A further purpose is to apply a casing of non-magnetic metal, as a wall of an induction electric furnace, in the locality where the current is being induced and to make the wall of the casing definitely thinner than the effective depth of penetration of the induction, so that the current is induced partly within the casing to heat the content by conduction and partly within a molten metal resistor, for the double purpose of also directly heating the resistor and of causing circulation in the resistor.

A further purpose is to render molten-resistor-type induction electric furnaces more effective for vacuum or pressure or special-atmosphere operation.

A further purpose is to divide the induction of current within a molten metal resistor and within a non-magnetic metallic casing about it so as to do part of the heating in the casing of the resistor and thereby reduce the amount of heating which need be effected within the molten metal content for a given heat input, thereby avoiding the danger of excessive pinch effect.

A further purpose is to vaporize the lower boiling point metals from molten alloys by induction passing in part through a metallic non-magnetizable container and developing the heat in part in the molten metal. This is applicable to coreless channel, submerged channel and other types of induction electric furnaces.

Further purposes will appear in the specification and in the claims.

The invention is illustrated by a few forms only of those to which it may be applied, forms being selected which are practical, effective and commercially desirable, but which have been selected primarily because of their illustration of the invention.

In the drawings similar numerals indicate like parts.

Proposals have been made for using metal pots or containers for holding molten pools of metals different from the metals of the containers, but the proposals have proved unsatisfactory when attempt has been made to apply them in induction electric furnace use, for the reasons usually that the metal of the container is magnetic and consequently allows but very slight depth of penetration of the current induced, and no induction through it, or because the metal is too thick to allow current to be induced in the content, or because the metal comprising the container is dissolved in or is attacked by the intended metal or alloy content.

Under the above conditions of small depth of penetration it would seem at first glance that ordinary steel, for example, could be used at a temperature above the decalescence point. This overlooks two factors, namely, the loss and delay in heating the container up above the point at which it loses its magnetism, known as the decalescence point, before beginning beneficial use of the container to inductively heat its content and the fact that normal steel is attacked by many of the metals or alloys which it might be desirable to melt or hold in molten condition within it. The temperature of intended use may be below the decalescence point and the temperatures of actual use may fluctuate, below and above the decalescence point.

In attempting to heat up the magnetizable material there is initially but very slight penetration of the induced current and this depth of penetration remains slight until this outer "skin" becomes heated beyond the decalescence point—a slow process since the adjoining metal forming the rest of the depth of the metal carries off the heat from the induced current.

When the outer "skin" has become heated to a point where it ceases to be magnetic, the induction penetrates through it and into a new layer which becomes in effect a new "skin" and which must be heated above the decalescence point before further increase of the depth of penetration. This process continues until the steel is practically all heated beyond the decalescence point before the induction passes through it to the content and current is induced in the content. The present invention avoids all of this, as also variation in induction where the temperature utilized is near the decalescence point and the container is sometimes above and sometimes below the decalescence point.

The present invention also avoids attack of the metal contained upon the walls of the container both because non-magnetic steel is comparatively free from attack by the normal alloys and metals to be melted and because it is capable of special treatment such as calorization by which it may be further protected from such attack.

So far as I am aware no one prior to the present invention has recognized the desirability of making a metallic casing for a molten submerged resistor thin enough and of such character that current is induced both in the casing and in the molten resistor.

Unless current be induced within the molten metal of the resistor the circulation of the resistor is made to depend upon Joule effect alone and is too sluggish to prevent excessive heating and, in many cases, undesired vaporization.

The present invention utilizes a non-magnetic resistor casing free from corrosion by the melt and thin enough for current to be induced through it in the resistor sufficient for the purpose of giving circulation but low enough in current value not to give trouble from pinch effect. It is possible to get along with this relatively small amount of current for circulation and with the lower heating value of this current than would be found in a normal resistor because the additional heat is supplied by conduction from the walls of the inductor within which inductor walls current is induced by the same flux which causes the induction of current within the molten resistor. Freedom from corrosion is attained by reason of the fact that non-magnetic steel alloys are also substantially free from corrosive action of copper and the materials with which it is normally alloyed as well as free from corrosion by other lower-melting-point metals. Additional resistance to corrosion and deterioration due to excessive heat may be secured by calorization.

If the walls of a non-magnetic non-corrosive resistor casing be made thin enough, both the casing and the resistor heat together and the molten metal of the resistor may be circulated and driven out of the resistor into the pool, or mixed more thoroughly within the resistor by electro-magnetic forces of attraction or of repulsion produced through induction within the resistor. The invention is also capable of use in furnaces of the ring type and of the coreless type in which there is no separated molten "resistor" or reduced section, in the ring type because the entire ring of molten metal is of the same section, and in the coreless type because the metal is kept together in one compact body.

Figure 1:
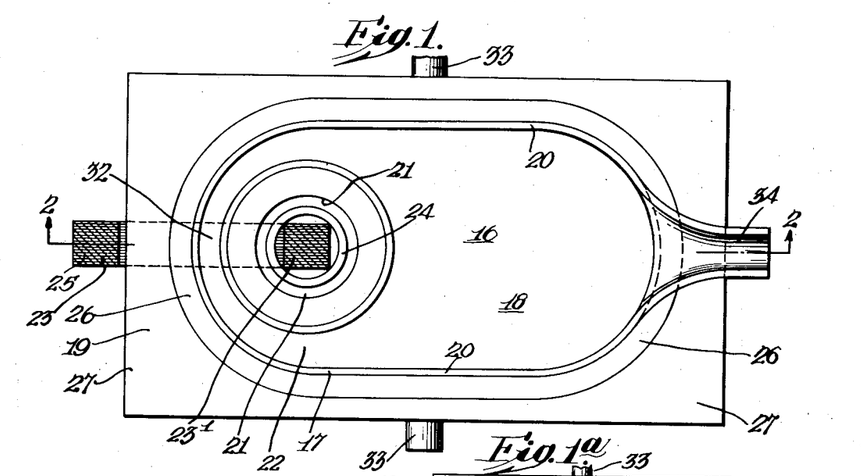
Figure 1 is a section of the structure shown in Figure 2, taken upon line 1—1 thereof.
Figures 1A, 2:
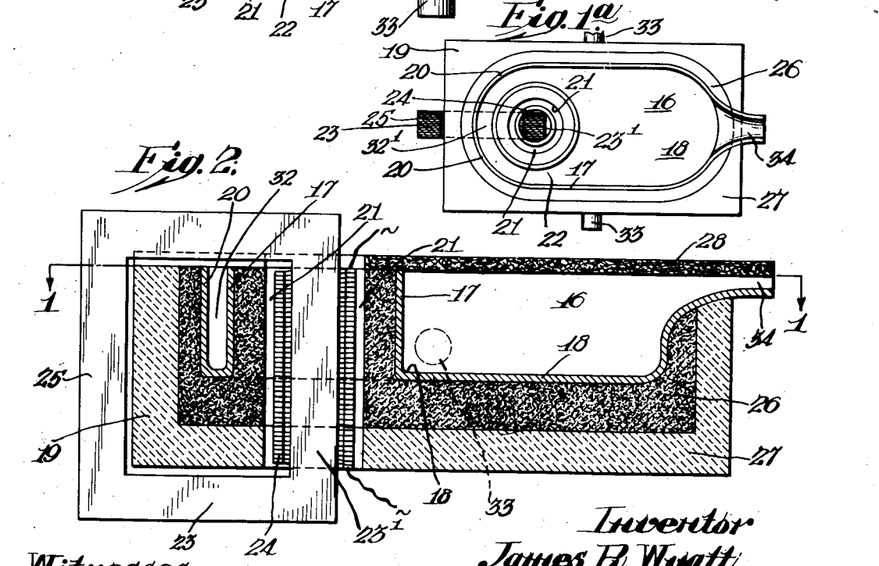
Figure 1a is a section corresponding to that of Figure 1, but showing a slightly modified form.
Figure 2 is a section corresponding to line 2—2 of Figure 1, but showing the cover not shown in Figure 1.
Figure 3:
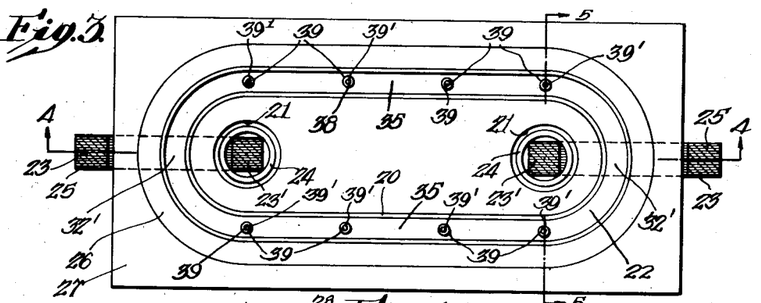
Figure 3 is a section taken upon line 3—3 of Figure 4.

In Figures 1, 1a and 2, a furnace is shown of the general Rochling-Rodenhauser type having a molten metal resistor communicating at both ends with a pool 16. Both the bath and the resistor are contained in a furnace body 17 of non-magnetic steel alloy having thin walls, comprising a bottom 18, open for transformer location near one end, at 19, sides 20, about the body and inner walls about the opening 21 in the bottom defining a channel which constitutes a solid resistor, within which the molten resistor 22 is contained. Through the opening 21 formed, transformer leg 23' of transformer 23 is passed.

The primary transformer winding 24 is located on that leg of the transformer which passes through the opening 21. The transformer is preferably of core-type. Its magnetic circuit is shown at 25.

By showing the core-type transformer it is not the intention to limit to this type, as a shell-type transformer would serve the purpose nearly as well as the core-type. Electrical connections to the transformer are shown, to be supplied from any suitable alternating current source not shown.

This form of the invention, and in fact all of the forms of the invention, may be protected where the temperature is intended to be high by a refractory 26 and by insulation 27. Both of these have been shown conventionally. The refractory may be of a clay type and may be rammed to place and the insulation may be of brick, or other preferred form built about the refractory. The refractory and insulation respectively carry the same members in the other figures, notwithstanding differences in thickness and shape, since they perform the same function in all the figures.

Covers 28 are shown in various figures, which may be protective only to prevent undue heat dissipation and access of foreign matter, or may seal the melt where vacuum or pressure is to be applied to the melt. They may be divided as desired and are intended to be easily removable.

Figure 8:
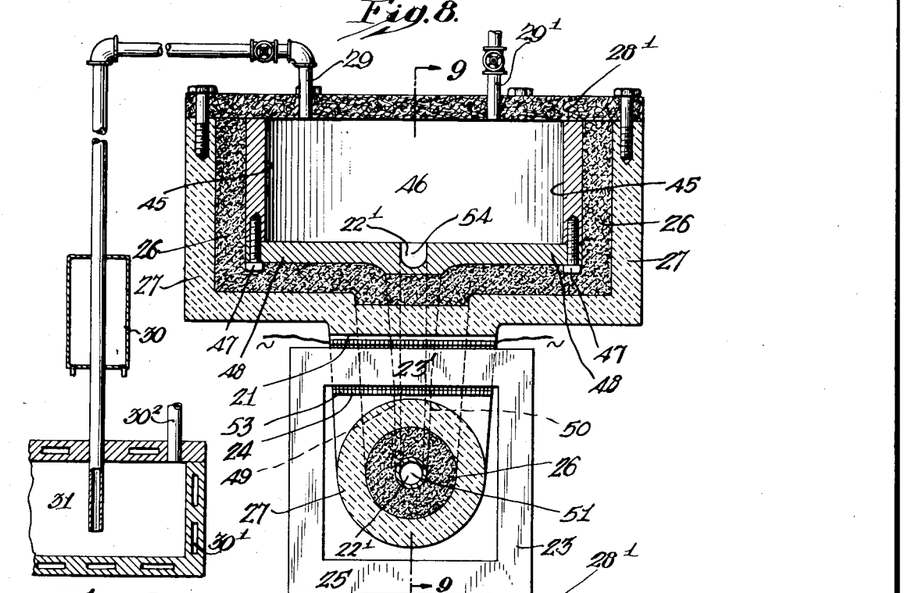
Figure 8 is a vertical section of a submerged resistor type of electric induction furnace taken through the center of the furnace and directly across the bottom of the resistor, being on the line 8—8 of Figure 9.

In Figure 8 a cover 28' is shown which may be used with any of the furnaces which have full level upper surfaces. It is intended to be tight enough to provide for evacuation through pipes 29 or 29' either for use under vacuum conditions through pipe 29 or for pressure, or vacuum with subsequent replacement (of the air evacuated) through pipe 29' by gases, inert to the pool under treatment or active in some treating operation. Bolts are shown for holding the cover on when pressure conditions are desired. This is intended to be conventional.

In Figure 8 the connections through pipe 29 are water cooled at 30 to make the pipe a condenser which empties into a receiver 31 for the molten metal condensed. The receiver is also water cooled, as at 30'. The pipes 29 and 29' may be valved suitably as shown, so that either or both can be closed. Vacuum conditions in the receiver and condenser and above the pool in the furnace may be maintained by connecting a vacuum source to the receiver through pipe 30², or vacuum may be secured above the pool by connections to evacuate through pipe 29'.

For brasses and other copper alloys a non-magnetic steel is desirable. Without in any way restricting to any single composition of non-magnetic steel or even to steel alloys it is noted that so-called stainless steel having a composition (approx.) of 74% iron, 18% chromium and 8% nickel has been found quite effective with brass. It is austenitic and therefore non-magnetic. It has been found highly resistant to corrosion by the brass content even without calorization. It has high resistance and low permeability and will withstand high temperatures. The permeability is substantially the same throughout the entire temperature range. Any austenitic steel or iron product offers the advantages above pointed out—though to varying degrees—throughout the temperature range at which the product retains its structural strength and resistance to corrosion.

As many of the austenitic steels or irons contain so little carbon as to make it debatable whether they are technically "steels" I herein use the term "steel" in its popular or commercial sense, and without an intention to indicate that any substantial percentage of carbon be present.

Wherever the corrosive effect of the melt upon the container or the high temperature intended for the operation makes it desirable, calorization or other treatment of the container is contemplated to protect it from corrosive or heat action.

The only intended difference between the structure of Figure 1 and that of Figure 1a is that the channel is tapered in Figure 1 to give its smallest cross section at 32, whereas the section in Figure 1a is the same at 32' as throughout the adjoining part of the channel.

The furnace is provided with conventional trunnions 33 in some of the figures and pouring spout 34 (Figures 1-2) or 34' (Figure 9) and 34² (Figure 10) may be used. Both of these are applicable where desired.

Figure 9:
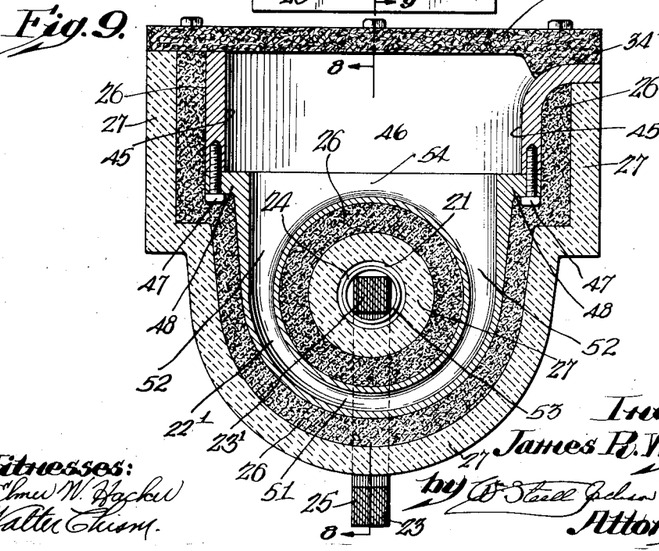
Figure 9 is a section of Figure 8 taken upon line 9—9 thereof.

The construction of the furnace makes it desirable that the walls be cast even though they may be cast in parts as in the construction shown in Figures 8 and 9. However, except as the intended treatment to prevent corrosion may affect the question, there is no reason why the container cannot be fabricated from sheet material. The various illustrations show the flexibility of the invention in suiting it to use in a variety of different types of induction electric furnace and with a variety of different furnace characteristics.

In Figures 3 to 7 inclusive, 5a and 5b, the invention is applied to a ring-type of furnace without a pool and in which the metal is withdrawn by tubes from the bottom of the ring.

Figures 4, 5, 5A, 5B, 6, 7:
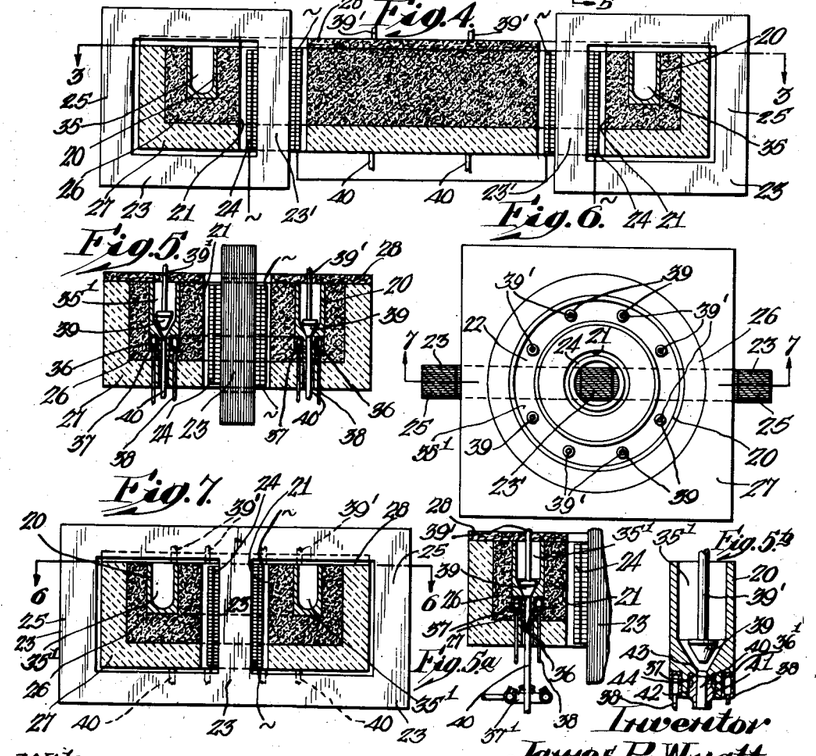
Figures 4 and 5 are sections taken upon lines 4—4 and 5—5 respectively of Figure 3.
Figure 5a is a section through a discharge tube of a multiple discharge ring furnace, showing cooling subject matter which may or may not be used in connection with the other figures.
Figure 5b is an enlarged fragmentary view of a portion of Figure 5.
Figure 6 is a section of Figure 7 taken upon line 6—6 of that figure.
Figure 7 is a section upon line 7—7 of Figure 6.

In Figures 3-5 and 6, 7 molten metal is held in annular thin walled troughs, gutters or channels 35, 35' of non-magnetic material which is not capable of alloying with the content and in which as in the other forms, the walls are thin enough for the induction to pass through them and into the content. The transformers in Figures 6 and 7 are of different type from those of Figures 3-5, but in all the primary coils are within the annuli.

Notwithstanding that there need be no intended difference in cross-section from point to point about the annulus, that is, of the molten resistor, and hence no intended difference in pinch effect, some pinch effect difference is bound to be present and the primary-upon-secondary induction will tend to cause circulation in the parts of the channel between the transformer and the center of each of the sides, (that is, each transformer will control circulation half way to the next transformer). The circulation will not be as good in these ring forms as in those having pools and connected molten resistors. However there will ordinarily be little need for circulation as these furnaces will receive molten metal as a charge and merely keep it hot or superheat it for withdrawal, or boil off lower-boiling-point metals where used for fractional distillation of alloys.

In all of the above figures which drain from the bottom, a plurality of bottom drains through nozzles 36 are shown. They may be integral with the channel bottoms or may be screwed into cylindrical bottom outlets 36' so as to provide smooth flow lines for molten metals as seen in the several figures.

The discharge walls leading from the bottoms of the channels, whether integral with the channels or supplemental to other outlets, are likewise non-magnetic and may be merely discharge outlets along what is in effect a hearth, or they may define, for example, forming chambers and dies, artificially cooled through compartments 37 and inlet and outlet connections 38 therefor, or otherwise, for producing cast bars or rods cast directly from the molten metal, of which art an example is shown in patent to Eldred No. 1,868,099. An outlet suited for forming channel and die purposes may be used as a normal pouring channel by merely passing the molten metal through it rapidly without cooling and stopping off the flow of molten metal at the end of the pouring period. Conventional plug closures 39 and operating rods 39' are shown.

Means for plugging the individual openings leading to the plurality of discharges shown in Figures 3-7 inclusive, conveniently stops the pouring at a point far enough within the mass of metal for the heat from the mass of molten metal to prevent undue chilling of the metal where its flow is stopped.

As compared with the Eldred mechanism and method of his Patent No. 1,868,099, applicant greatly reduces the mass of molten metal in immediate thermal connection with the congealing rod or bar by drawing the molten metal and congealing it from a channel merely instead of from a full furnace body of metal. The coned outlets may be used for dies, avoiding the necessity for separate dies and making it possible to chill the molten metal not only within but above the terminals, avoiding the necessity for withdrawing the heat of congelation substantially solely through the previously congealed metal 40 as is recognized to be the case in that patent.

As will be seen cooling through the previously congealed metal by means of an external spray 37' may be effected quite as well here as in the Eldred form (Figure 5a).

Cooling the tapered outlet as a part of the metal wall integral with the channel offers advantages in that the molten metal immediately adjacent the outlet and within the channel walls is cooled also and requires less cooling to congeal it than would be the case where it is necessary to pass the metal preliminarily through graphite or carborundum.

The construction shown also avoids the necessity—and desirability—of supplying high heat insulation, such as that shown at 9' in the patent. The rods or bars may be drawn by devices which are well known and for this reason have not been illustrated.

In Figure 5b the construction is intended to protect the attachment (here a thread) for a separate outlet or die 36' by placing the thread in the pipe and in the lug or box down below the connection with the ring channel so that the interfitting threads 41 and 42 are located at a suitable distance from the channel tapered portion 43 and from the actual point of connection 44.

The fact that the ring is metallic greatly facilitates the application of these separate pouring taps or nozzles which may be threaded in as in Figure 5b so as to protect the thread by the engagement of the rim of the nozzle with a flange cast upon or died out of the ring.

In all of these ring types (Figures 1 and 2) and ring forms (Figures 3–7) so far discussed, the operation is substantially the same. The current induced by the primary coil divides between the channel wall and the channel content, highly heating the channel content both by the current induced within it and by conduction from the highly heated channel wall.

The proportion of current within the channel wall and within the channel content may be predetermined with great exactness by reducing the channel wall thickness to reduce the current flow in it and relatively increase the flow in the content and by increasing or reducing the channel content cross section to relatively reduce or increase the heating effect of the current within it and of the heat supplied to it by conduction.

Cutting down the channel wall cross section reduces the flow of current in the channel wall as compared with that in the content for two reasons; both because it increases the resistance to current flow in the wall and because it allows a larger percentage of the induction to pass through the wall and into the molten content. Both the pinch effect and primary-on-secondary effect upon the molten resistor secondary are reduced by reduction of the current in the molten secondary. The pinch effect can be accentuated, where additional circulation is desired, by tapering the resistor.

Subject to closure of the pouring spout opening and the opening beneath the transformer by any suitable means, all of the forms discussed are capable of use under vacuum or pressure conditions or with special atmospheres (just as in the case of Figures 8–12) and the channel walls can be treated in these forms as in the others shown to render them less corrosive and less affected by heat. Subject to care to secure effective closing, pressure can be used in the bottom-outlet channel forms to assist discharge.

The furnaces shown are not intended primarily as melting furnaces notwithstanding that they are capable of melting the metal. They are intended preferably to be used for handling (with or without superheating) metal melted elsewhere and poured into the furnace through any suitable spout.

The furnaces may be tilted by any suitable mechanism of which many different forms have been patented, including two of such patents taken out by me, Numbers 1,430,714 and 1,432,007.

It will be noted that the effect above discussed is dependent upon the channel content being of electrically conducting material; but that the channel can be used to advantage to heat a material which is not electrical conducting, taking advantage of the low permeability of the metal of the channel even at low temperatures and freedom from fluctuation of permeability to distribute the heating current throughout practically the entire mass from the start by selection of frequency.

It will be noted that the invention is adapted for use with a furnace of a Rochling-Rodenhauser type which is intended for use on relatively short runs of individual metals and is intended to be wholly emptied between uses or with furnaces such as are shown in Figures 8–11 which are intended to run for considerable periods of time upon continued charges of the same character.

The idea of utilizing a ring or ring-type furnace to supply nozzles pouring from beneath the body of the molten metal from point to point along the length of the ring is believed to be valuable in itself, entirely independently of the material of which the ring is composed, because it offers wholly independent spaced tapping points supplied with metal at the same temperature and under the same conditions; but to be particularly valuable in connection with a metallic ring of non-magnetic material and metallic nozzles capable of being connected with the ring to such advantage. Where the channel is elongated, as in Figure 3, the long flat sides give the "hearth" an extra "width", all laterally stirred and concurrently tapped at a plurality of points.

The furnace even when cast need not be cast in a single piece. Thus, in Figure 8, the walls 45 of the pool 46 comprise a ring—which may be a cylinder—fastened by bolts 47 to bottom plate 48 with which a submerged resistor channel is integrally connected.

The walls of the channel are shown as depending directly beneath the bottom of the pool. In one direction the channel walls are narrowly separated and the channel is of uniform narrow width in this direction, that is, a direction parallel to the paper in Figure 8.

The question of whether the interior facing walls 49 and 50 be parallel or be tapered affects the extent and somewhat the character of dominant circulation, determining whether it is due to primary-on-secondary reaction or pinch effect. Change in the relative proportions affects that purpose of the furnace which is concerned with proper division of the induced current between the channel wall part of the secondary on the one hand and the induced current in the molten metal part of the secondary on the other, and affects the character and speed of molten metal circulation but does not otherwise affect application of the invention herein.

Tapering of the channel walls in Figure 1 may be applied to the channels of the other figures, which may be tapered if desired and this applies as well to the channel of Figure 8.

From Figure 9 it is evident that the upper parts of the non-magnetic channel walls forming both a resistor and a retainer for a molten resistor, 22', are tapered in a dimension at right angles to that shown in Figure 8, in that the channel 51, shown as of uniform circular section at the bottom in the dimensions appearing in Figure 9, flares at 52 as it passes above the center line of the coil 53. The flaring oval portions on the two sides unite in the channel 54 across the bottom of the pool.

The austenitic or other non-magnetic metal preferably extends entirely to the top of the pool though practically its inclusion within the induced circuit stops at the bottom of the pool.

The construction of Figures 8 and 9 is intended to represent submerged channel furnaces having curved longitudinal channel axes whether the character of circulation be dominated by pinch effect or primary-on-secondary motor effect and—notwithstanding that their chief use will be found in holding or treating charges elsewhere melted—whether they melt the charges or not and whether, if not, they hold merely or superheat.

Figures 10, 10A, 11, 12:
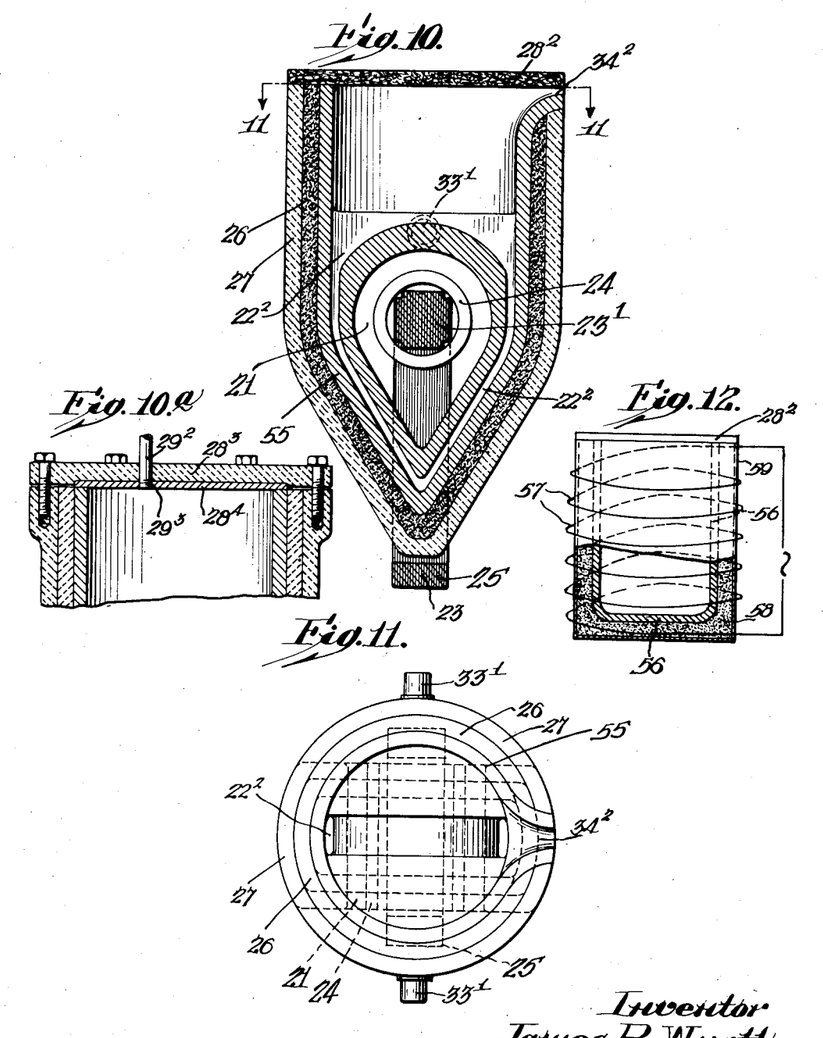
Figure 10 is a section of another form of submerged channel electric induction furnace corresponding to the position of Figure 8.
Figure 10a is a fragmentary section corresponding generally with Figure 10, but showing a modification.
Figure 11 is a section of Figure 10 taken upon line 11—11.
Figure 12 is a central vertical section of a coreless electric induction furnace embodying my invention.

On the other hand Figures 10, 10a and 11 represent furnaces of the general type found in Wyatt Patent No. 1,201,671. The furnace shown has a rectangular channel section, as distinguished from the round or curved channel section of Figures 8 and 9. It also has a V channel and secondary-on-secondary circulation largely dominates. The channel 22³ is formed within a casing 55 of non-magnetic metal which may desirably be of non-magnetic steel. The transformer arrangement is substantially the same as that in Figures 8 and 9 and a cover 28² is shown in place.

In Figure 10a the cover 28³ is held in place by bolts and is provided with a cover plate 28⁴ of different material for the purpose of permitting tighter sealing with the case than otherwise available. The cover plate 28⁴ may be metallic and may be non-magnetic for the purpose of being resistant to contamination. The stainless steel previously referred to is quite effective for such a purpose.

For vacuum, or for pressure or for substitution of neutral or treating gases pipe 29² is provided, which may be suitably connected and controlled for any of these purposes, as, for example, in Figure 8.

The casing in Figures 10, 10a and 11, as in the other figures, is intended to be thin enough so that current will be induced not only in the casing but in the molten resistor within the channel—as in the other cases. The type of furnace shown in Figure 10 has quite a strong circulation. Any proportion of this may be maintained (within the limit of metal thicknesses sufficient to hold the charge) by making the casing walls thick if it be desired to have but slight circulation, and thin if it be desired to maintain as nearly the full circulation as possible. The walls have been shown as slightly thicker than the walls in the other views.

In Figure 12 the crucible 56 of non-magnetic metal is surrounded by a coil 57 to form a so-called "coreless" type of furnace, which embodies my invention. The coil has been shown as conventionally connected with a source of alternating current. The crucible to advantage may be made of non-magnetic steel.

In order to secure the full benefit of the invention in Figure 12 the frequency would have to be low enough as compared with the thickness of the crucible walls for current to be induced not only within the crucible walls but in the melt held by them, limiting the frequency in Figure 12 to such as would fulfill these conditions.

The crucible is shown as heat-insulated at 58 and the heat insulation is retained within electrically insulating outer walls 59.

One of the anticipated uses of the present invention is in fractional distillation, such as the distillation of zinc and subsequently of lead from copper. For this purpose the furnaces of the several figures are well suited.

The molten resistor type furnace, and particularly the submerged resistor induction electric furnace have been known to be highly efficient heating furnaces and, from this standpoint, are well suited for fractional distillations, but the necessity for using refractory linings to hold the molten metal and the high pinch effect have made it difficult in commercial use in the past to secure good results.

Because the present invention holds down the pinch pressure and provides a metallic container which may be closed conveniently and tightly for vacuum (or pressure use, or the use of inert or of treating gases), the submerged resistor type of furnace is now rendered much more available for fractional distillation.

Non-magnetic steel previously referred to, and other non-magnetic steel alloys already available will stand a temperature hundreds of degrees higher than is necessary for the fractional distillation and the freedom from objectionable pinch pressures avoids the danger of breaking the resistor circuit which with high rates of heat input is present where the tendency to disruption due to pinch is complicated by the evaporation of the metals being distilled off in the highly heated resistor.

By melting the metal elsewhere and pouring the molten metal into the induction electric furnace for the fractional distillation, the higher temperatures necessary for melting are avoided; with the result that non-magnetic casing alloys may be utilized even if they be incapable of resisting the higher temperatures required in a melting furnace.

Though vacuum conditions can be maintained by structure of the character of that shown in Figure 8 using a non-magnetic cover, a greater exactness of fit and complete freedom from leakage of atmosphere through the cover can be secured by using a metallic cover which will make a metal-to-metal fit with the upper wall of the pool. In order to do this it is not necessary that the entire cover shall be metallic, as the inner face alone of the cover may be effective as a vacuum closure for the top of the furnace as in Figure 10a. Moreover, where difficulty is anticipated, or is found with vacuum sealing at the pouring spout as illustrated in Figures 8 and 9, the quality of the seal can be improved by omitting the pouring spout.

Metal-to-metal sealing of the cover for the pool casing may be applied to other submerged channel forms from which the pouring spouts may also be omitted and in which the vacuum, pressure or special gas tube connection may be fastened by metal-to-metal engagement, threaded as in Figure 10a if desired.

It will be noted that in Figure 8 the channel walls outlining the molten resistor are tapered in thickness transversely of the molten resistor and that in Figure 9 the side faces of the resistor walls flare outwardly as they extend upwardly above the level of the transformer axis; both resulting in an increase of cross section for the current path within the channel walls as the current approaches the pool, concentrating the heating effect within the channel walls in the lower part of the channel where the molten resistor is of small cross section and where Joule circulation will be poorest. This can be taken advantage of to heat a molten metal alloy in the lower part of the resistor to a much higher temperature than the temperature of the rest of the resistor, causing vaporization of the lowest boiling-point metal entering into the alloy and permitting successive vaporization of metals from the alloy one at a time in succession, beginning with the lowest-boiling-point metal.

It will be evident that superheating brass, for example, from which zinc and/or lead is to be distilled, facilitates the formation of zinc and/or lead vapor in the regions below the surface of the bath and avoids condensation of the vapor as it passes upwardly to the surface of the bath. Maintenance of a vacuum above the pool reduces vapor pressure above the bath, increases the rate of vaporization within a given time and facilitates the flow of vapor to a point of condensation, conventionally shown.

The crucible form of furnace is also available for the same purpose and the higher vaporizing point metals distilled off may be condensed and collected from any of the furnaces in any suitable manner, using the pressure of the metal vapor to convey the vaporized metal to the condenser, with or without the use of a vacuum. The showing in Figure 8 is intended, of course, to be conventional only.

One of the difficulties in the use of coreless furnaces with lower frequency currents has been the excessive stirring inherent to the current necessary to properly melt or to heat the metal. The present invention offers relief from it in that any desired proportion of the heating current used may be applied to the crucible, reducing the current within the melt and correspondingly reducing the stirring effect. However the heat is most effectively applied within the content, that transmitted by conduction from a heated crucible is economically applied, giving a maximum of heating effect within the content at a minimum of stirring effect.

The invention is beneficial also in use with coreless furnaces upon contents which are poor conductors from an electrical standpoint, or which are electrically non-conducting. It makes it possible not only to heat the content from a metal container, but to proportion the thickness of the container walls and the depth of penetration of the frequency used so that the heat may be generated within substantially the entire thickness of furnace wall instead of being generated within an outer skin of this wall only, suiting it well to use for temperatures below the recalescence point of steel with all of the benefits of a normal steel container, yet free from the objections due to its magnetic character.

It will be evident that the intended operation of the furnace can be changed in the design to develop all the heat within the metal of the container walls, or any desired portion of it within the container walls and the remainder within the content by varying either of two factors, namely, the wall thickness and the frequency; and that this can be done not only in the open channel form (with or without an associated pool) but in the submerged channel forms and in the coreless type. Thus the thickness of the wall may be made just right for the depth of penetration at a frequency planned, or conveniently available, so that the heat will be developed substantially in its entirety within the channel walls. On the other hand, the frequency used may be such as to induce current almost entirely or largely in the channel walls with such proportion as planned for in the molten content within the walls, the thickness of channel wall and frequency being so interrelated that the character of operation in so far as division of current between the walls and the content is concerned is a common factor of both of these factors—with the fundamental qualification, however, that the walls must have sufficient thickness to provide the requisite mechanical strength.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention, what I claim as new and desired to secure by Letters Patents is:—

1. The method of heating and circulating a molten resistor within metallic channel resistor walls and thence into a pool of molten metal which consists in casing the molten resistor in a nonmagnetic metal alloy predominantly iron, having low permeability, high resistivity and a surface free from contamination by the molten metal of the resistor content at the temperatures intended and in inducing secondary current divided between the nonmagnetic ferrous alloy of the channel and the molten metal resistor content of the channel, whereby the molten resistor is heated by conduction from the channel walls and is heated additionally, and is circulated from the metallic channel into the pool, by current flowing within the molten resistor.

2. The method of operating a transformer coupled induction furnace to secure maximum heating with regulated molten metal circulation in the furnace pool, which consists in developing part of the heat by current within an electrically conducting nonmagnetic metallic container composed principally of iron surrounding the core of the transformer and the remainder of the heat by current induced within the content and the pool and controlling the amount of electric current developed in the molten resistor to get a maximum current, while preventing undue pinch effect, by the thickness selected for the casing.

3. The method of controlling an induction furnace having pool walls, a nonmagnetic metallic channel casing connected with the pool and electrically conducting at all temperatures, and a submerged molten resistor within the casing and connected with the pool to secure maximum heating with regulated molten metal circulation which consists in developing part of the heat by inducing electric current within the casing and the remainder of the heat and fluid circulation by inducing electric current within the molten resistor, proportioning the induced currents respectively in the casing and in the resistor by the thickness of the casing to avoid excessive pinch pressure in the resistor, and circulating the molten resistor within the casing and pool by the current induced in the molten resistor.

4. The method of controlling the extent of induction of electric current within a molten secondary of a submerged resistor type furnace to prevent undue pinch effect therein while securing maximum heating effect and effective circulation, which consists in taking up a part of the secondary current within the walls confining the molten resistor secondary and in using the thickness of the walls for any given frequency to limit the induction in the molten secondary below its permissible pinch effect maximum.

5. In the art of heating the molten metal of a furnace by electric current induced within a submerged molten resistor encased in channel walls and delivered into the pool by circulation of the resistor, the novelty which consists in developing part of the heat in the channel walls and in using the thickness of the channel walls to restrict the current developed in the molten resistor so as to avoid objectional pinch effect.

6. A fluid-tight resistor casing comprising an electrically closed channel casing forming a path for molten metal, whose channel walls are of an austenitic ferrous alloy predominantly iron, having high resistivity and low permeability and walls forming a pool connected with the closed channel whereby in operation the molten metal in the channel is kept submerged by the metal in the pool.

7. An induction electric furnace of the molten metal resistor channel type having thin metal walls of low permeability forming the walls of the molten metal resistor channel and of a pool with which the channel is connected and having a passage for a transformer, the walls of the resistor being of such thickness for the particular furnace that induced current flows within the channel walls and within the molten metal concurrently, a transformer core passing through the opening and having a closed magnetic circuit, a primary winding upon the leg of the transformer core passing through the opening, and insulating material protecting the channel and pool walls.

8. A cast metallic non-magnetic induction electric furnace submerged channel casing having thickness below the depth of penetration of the inducing current for which the particular furnace is designed, walls forming a pool connected therewith and a core type transformer having its upper leg and its primary winding passing through the submerged channel.

JAMES R. WYATT.